United States Patent
O'Bannon et al.

(10) Patent No.: US 11,286,001 B2
(45) Date of Patent: Mar. 29, 2022

(54) ANGLED CROSS MEMBER FOR A VEHICLE

(71) Applicants: Andrew L O'Bannon, Clarkston, MI (US); Joseph E Rudelic, Canton, MI (US); Thomas F Wentworth, Sterling Heights, MI (US); Meenakshi Solaimalai, Auburn Hills, MI (US); Janakiram Sholingar, Rochester Hills, MI (US); Eric J Stahmer, Troy, MI (US)

(72) Inventors: Andrew L O'Bannon, Clarkston, MI (US); Joseph E Rudelic, Canton, MI (US); Thomas F Wentworth, Sterling Heights, MI (US); Meenakshi Solaimalai, Auburn Hills, MI (US); Janakiram Sholingar, Rochester Hills, MI (US); Eric J Stahmer, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 179 days.

(21) Appl. No.: 16/561,925

(22) Filed: Sep. 5, 2019

(65) Prior Publication Data

US 2021/0070365 A1    Mar. 11, 2021

(51) Int. Cl.
*B62D 21/08* (2006.01)
*B62D 25/08* (2006.01)
*B62D 21/15* (2006.01)

(52) U.S. Cl.
CPC .......... *B62D 21/08* (2013.01); *B62D 21/155* (2013.01); *B62D 25/082* (2013.01); *B62D 25/085* (2013.01)

(58) Field of Classification Search
CPC ........ B62D 21/02; B62D 21/08; B62D 21/15; B62D 21/152; B62D 21/155; B62D 25/08; B62D 25/082; B62D 25/085
USPC .............. 296/187.08, 187.1, 203.01, 203.02
See application file for complete search history.

(56) References Cited

U.S. PATENT DOCUMENTS

| | | | |
|---|---|---|---|
| 6,685,243 B1 | 2/2004 | Evans | |
| 8,398,154 B1 | 3/2013 | Nusier et al. | |
| 8,480,130 B2 | 7/2013 | Dandekar et al. | |
| 8,720,981 B1* | 5/2014 | Shafer | B62D 25/025 296/193.07 |
| 9,550,463 B2 | 1/2017 | Hara et al. | |
| 2006/0113784 A1* | 6/2006 | Kishima | B62D 21/155 280/784 |
| 2007/0132223 A1* | 6/2007 | Scheffzuek | B62D 21/155 280/784 |
| 2013/0069377 A1 | 3/2013 | Qu et al. | |
| 2013/0081897 A1* | 4/2013 | Dandekar | B62D 21/155 180/291 |
| 2014/0117716 A1* | 5/2014 | Patberg | B62D 1/04 296/187.08 |
| 2015/0274209 A1 | 10/2015 | Basappa et al. | |
| 2020/0047808 A1* | 2/2020 | Ajisaka | B62D 35/02 |

* cited by examiner

*Primary Examiner* — Jason S Daniels
(74) *Attorney, Agent, or Firm* — Ralph E. Smith

(57) ABSTRACT

A structural assembly for a vehicle, including a first rail extending in the nominal direction of forward vehicle travel, a second rail extending in the nominal direction of forward vehicle travel and a cross member having a main body having a first end and a second end, and being joined inboard of the first end to the first rail and inboard of the second end to the second rail, wherein the first end and second end of the cross member are angled relative to the direction of forward vehicle travel at an obtuse angle.

17 Claims, 4 Drawing Sheets

ANGLED CROSS MEMBER FOR A VEHICLE

FIELD

The present disclosure relates to one or more angled cross members for a vehicle structural assembly.

BACKGROUND

Automotive vehicles may include a structural assembly including one or more rails extending rearwardly from a front bumper. The rails provide structure to which various vehicle components can be mounted, such as the front bumper and the vehicle engine. The rails have been arranged in a forward and rearward orientation relative to the vehicle and one or more straight, cross-car extending members may interconnect the rails.

SUMMARY

A structural assembly for a vehicle, including a first rail extending in the nominal direction of forward vehicle travel, a second rail extending in the nominal direction of forward vehicle travel and a cross member having a main body having a first end and a second end, and being joined inboard of the first end to the first rail and inboard of the second end to the second rail, wherein the first end and second end of the cross member are angled relative to the direction of forward vehicle travel at an obtuse angle. In at least some implementations, the main body has a forward facing surface that is concave and a rearward facing surface that is convex. The forward facing surface of the cross member may have a length between the first end and second end, and the forward facing surface is curved and may have a ratio of a radius of curvature to length of between 0.7 and 4.5.

In at least some implementations, the cross member is coupled to a main side rail of the vehicle chassis. The cross member may be coupled to rails or other structural members of an engine cradle, and the first rail and second rail may be coupled to and/or part of the engine cradle.

In at least some implementations, the angle of the ends of the cross member to a centerline of the cross member that is parallel to the direction of forward vehicle travel is between 135 and 165 degrees. The first end and second end may be mirror images of each other.

In at least some implementations, the first end and second end include a forward surface and a rearward surface, where the forward surface leads the rearward surface of the vehicle in forward vehicle travel, and wherein the forward surface that is closer to a fore-aft centerline of the vehicle than is the rearward surface.

In at least some implementations, the first rail and second rail are adapted to be received closer to a fore-aft centerline of the vehicle than are the wells for vehicle wheels. The cross-car length of the cross member may be less than the cross-car distance between the wells for the vehicle wheels.

In at least some implementations, a connector is coupled to the first rail and includes a threaded section, a bushing is aligned with the threaded section, and a bolt is received through the bushing and has threads received in the threaded section. The cross member may include an opening into which the bushing extends and the bushing engages the connector and the cross member is coupled to the first rail by the bolt, bushing and connector. The bushing may mechanically interlock with the connector providing a joint area larger than the diameter of the bolt. The connector may include a counterbore defined by a flange and an end of the bushing may be received within the counterbore such that the flange surrounds and axially overlaps the end of the bushing. The bushing may be tubular and have an inner surface that defines an inner diameter that is larger than the outer diameter of the bolt providing clearance between the inner surface and the bolt.

In at least some implementations, a structural assembly for a vehicle, includes a chassis having a first portion and a second portion spaced from the first portion in a cross-car direction, and a cross member. The cross member has a main body having a first end and a second end, and is joined inboard of the first end to the first portion of the chassis and inboard of the second end to the second portion of the chassis. The first end and second end of the cross member are angled relative to a direction of forward vehicle travel at an obtuse angle. In at least some implementations, the main body has a forward facing surface that is concave and a rearward facing surface that is convex.

DETAILED DESCRIPTION

Figure 1:
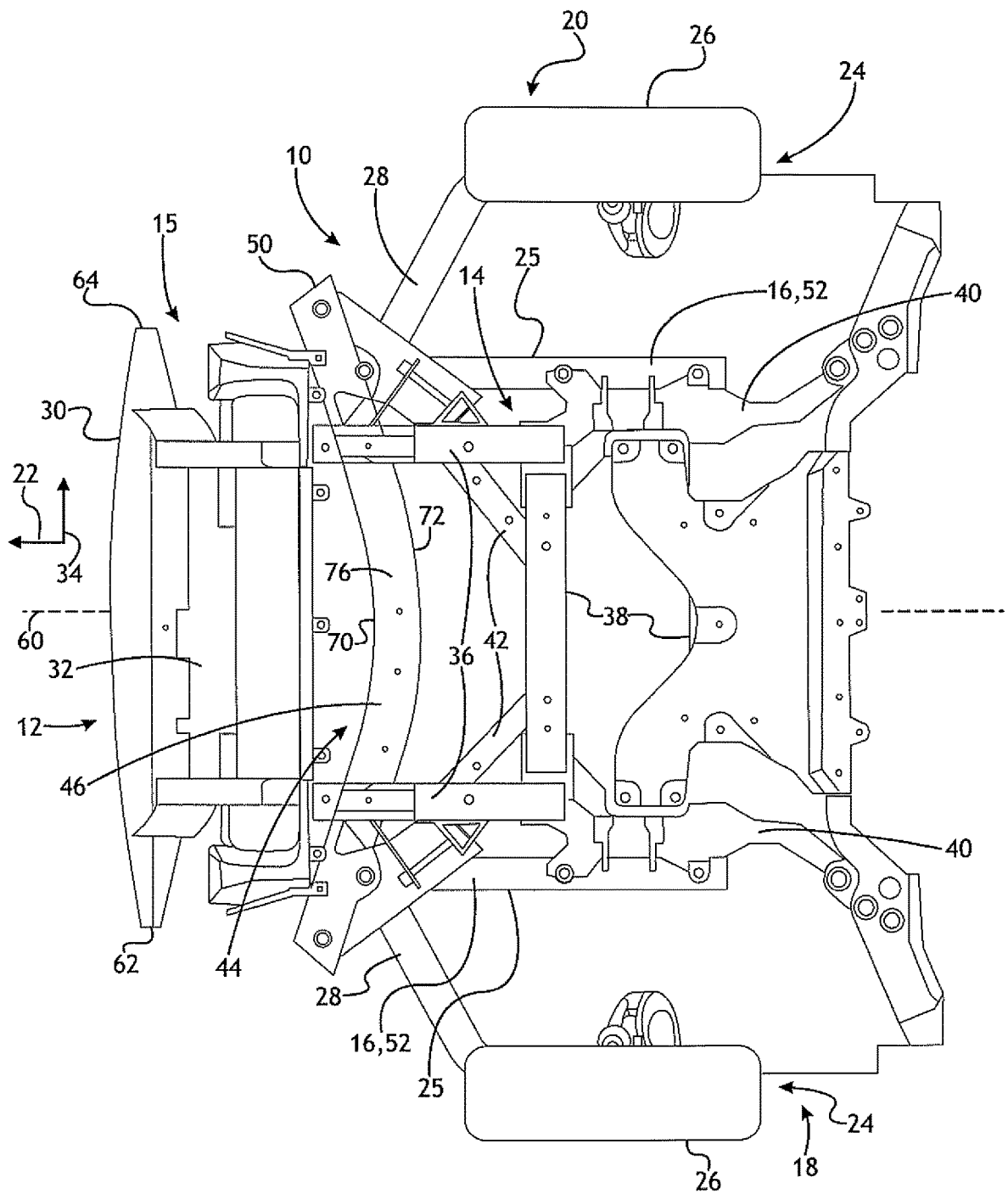
FIG. 1 is a view of a portion of a front end of a vehicle, looking upwardly from beneath the vehicle and showing an engine cradle, forward extending rails and an angled cross member of the vehicle structural assembly.

Referring in more detail to the drawings, FIG. 1 illustrates part of a vehicle chassis 10, including a front end 12 of the vehicle, components of an engine cradle 14 and a front-end module 15. These parts provide a structural base for vehicle components like the body panels, powertrain and drive train.

The chassis 10 includes side rails 16 that extend along opposite driver and passenger sides, 18 and 20 respectively, of the vehicle. The side rails 16 extend generally in a fore-aft direction (sometimes called the longitudinal direction) that extends from the front of the vehicle toward the rear of the vehicle and is aligned with nominal, straight forward travel of the vehicle, indicated by arrow 22. The side rails 16 may curve inwardly in the front and rear of the vehicle and are received between the front and rear vehicle wheels, and may define part of the wells 24 in which the wheels are located, and may include mounting hardware for the vehicle shafts and wheels (e.g. control arms, coils and the like), and other components.

Figure 4:
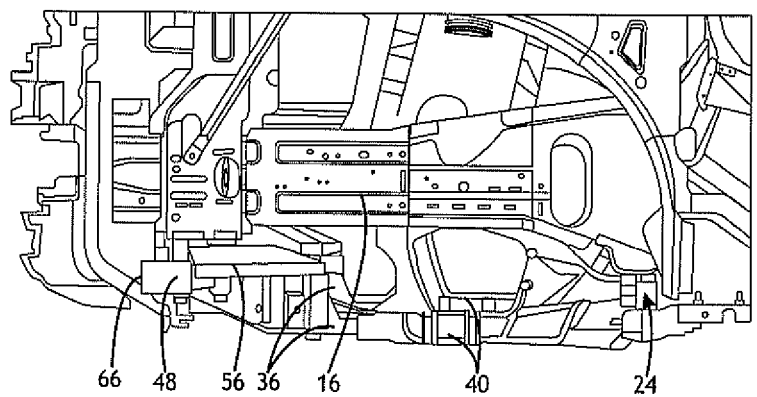
FIG. 4 is an enlarged fragmentary side view of the structural assembly.
Figure 5:
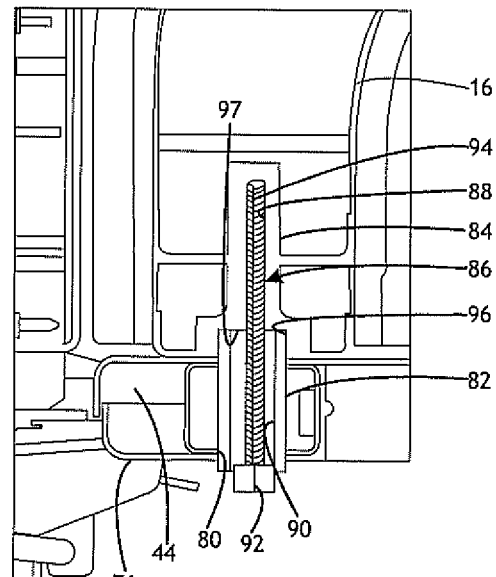
FIG. 5 is an enlarged sectional view showing a bolt interconnecting the cross member and another structural member.

Outwardly facing sides 25 of the rails or adjacent structural members of the vehicle may define or extend along part of the wheel wells 24 in which the vehicle front wheels 26 are located. The wheels 26 are arranged to roll in the fore-aft direction, and are mounted to the usual structures to enable turning. One or more brackets or structural members for the suspension of the wheels may be coupled to the side rails 16 or other structural members. As shown in FIGS. 1 and 4, on each side of the vehicle, a suspension bracket 28 is connected at a forward end to the side rail 16 and extends rearwardly toward the wheel 26. The bracket 28 may have at least a portion that is outboard of the side rails (in other words, between and outer side 25 of the side rails 16 and the adjacent side of the vehicle). The side rails 16 may extend to or near the front of the vehicle and the front-end module 15 may be mounted to the side rails 16 and/or other structural members at the front of the vehicle.

The front-end module 15 may include or be connected to a front fascia (not shown), bumper 30, a radiator mount 32, and possibly other components. The fascia and bumper 30 may extend in a cross-car direction indicated by arrow 34 (sometimes called the lateral direction, which extends between driver and passenger sides of the vehicle) and may be directly coupled to the side rails 16 and/or to other structural members of the vehicle chassis 10. In at least some implementations, the fascia or bumper 30 may define the forward most portion of the vehicle.

An engine may be mounted rearward of the front-end module 15 and may be carried at least in part by the engine cradle 14 that may be connected to the side rails 16. The cradle 14 may include one or more fore-aft oriented rails, called herein fore-aft members 36, and one or more cross-car oriented rails, herein called cross-car members 38. The fore-aft members 36 may be spaced apart in the cross-car direction with one rail located on each of two opposed sides 18, 20 (e.g. left and right or driver and passenger sides) of the engine cradle 14 or engine compartment. The fore-aft members 36 may include or be coupled to engine brackets or mounts 40 that have portions extending upwardly to provide brackets on opposite sides of the engine. To support the mounts 40 and engine coupled thereto, the fore-aft members 36 may extend beneath the mounts 40, through a channel defined by the mounts and/or may be coupled to a forward portion of the mounts and extend forwardly from the mounts. To support the engine cradle 14 and engine, the fore-aft members 36 and mounts 40 may be coupled to the main chassis 10, such as to the side rails 16 and/or other structural components. The fore-aft members 36 may be received inwardly of the side rails 36, if desired, and are received laterally between the front wheels 26. The fore-aft members 36 extend forwardly beyond the front wheels 26 to or toward the bumper 30 or other cross-car extending member at or near the front of the vehicle.

The cross-car members 38 of the engine cradle 14 may be linear and spaced apart in the fore-aft direction, and may be coupled at opposed ends to one or both of the mounts 40 and fore-aft members 36. The cross-car members 38 provide support against twisting and lateral (cross-car) movement or bending of the fore-aft members 36 and/or mounts 40. To improve the structural integrity of the cradle 14 and provide a more robust mount for the engine and a more robust chassis 10, one or more angled brackets 42 or supports may extend between the fore-aft members 36 and cross-car members 38, and/or such members and other vehicle chassis components.

Figure 3:
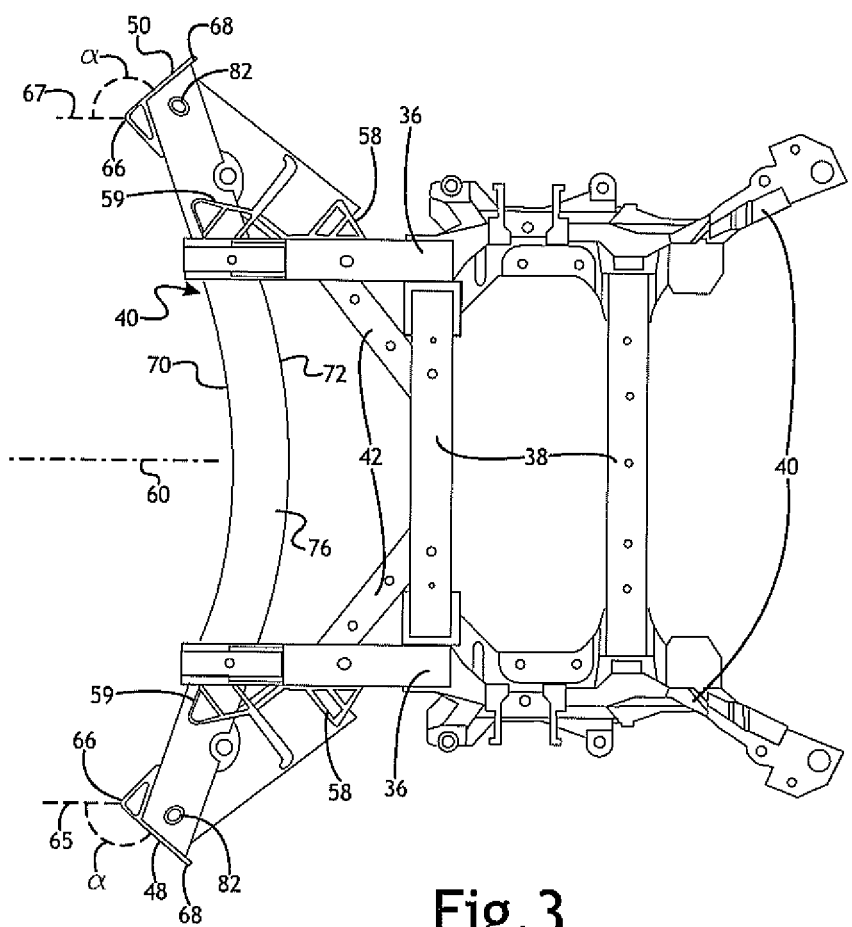
FIG. 3 is a top view of the portion of the assembly shown in FIG. 2.

A cross member 44 may be coupled to the chassis 10. The cross member 44 has a main body 46 that has a first end 48 and a second end 50, and the main body 46 may be connected to a first portion of the chassis 10, and to a second portion of the chassis 10. In at least some implementations, the first portion of the chassis 10 includes a first side rail 16, a first one of the fore-aft members 36 of the engine cradle 14 or both. Similarly, the second portion of the chassis 10 may include the other side rail 16, another fore-aft member 36 of the engine cradle 14 or both, or, for example, a lower control arm bracket. Thus, the cross-member 44 may be directly connected to one or both of the side rails 16 and engine cradle 14. In at least some implementations, the cross member 44 is connected to a lower side 52 of the side rails 16 (generally facing the surface on which the vehicle is situated) and is located rearward of the front-end module 15 (i.e. rearward of the bumper 30) and forward of the engine/engine cradle 14. In at least some implementations, the cross member 44 is located above the upper surface 54 of the fore-aft members 36 and one or more brackets or braces 56 extend between the cross member 44 and each fore-aft member 36. In the implementation shown, a brace 56 is coupled to each cradle fore-aft member 36 via a bracket 58 and is coupled to the cross member 44 directly or via a bracket 59 (FIG. 3). Each brace 56 may extend from a respective one of the cradle fore-aft members 36 outwardly toward the adjacent end (either 48 or 50) of the cross member 44, and in at least some implementations is at an angle to a longitudinal or fore-aft centerline 60 of the vehicle of between zero and sixty degrees, although other arrangements may be used.

The ends 48, 50 of the cross member 44 are arranged laterally outboard of the engine cradle 14 (e.g. laterally outboard of the fore-aft members), and the side rails 16, at least the portion of the side rails 16 that is located laterally between the vehicle front wheels 26. The ends 48, 50 of the cross member 44 may extend outwardly beyond the lateral ends 62, 64 of the bumper 30 and/or remainder of the front-end module 15 (excluding body panels like the front fascia which define the exterior of the vehicle). In at least some implementations, the first end 48 and second end 50 of the cross member 44 are angled relative to the direction of forward vehicle travel 22 (or the vehicle centerline 60) by an obtuse angle $\alpha$ (i.e. an angle that is greater than ninety degrees and less than one hundred and eighty degrees). In FIG. 3, the angle $\alpha$ is indicated between the ends 48, 50 and lines 65, 67 parallel to the centerline 60 and forward travel direction 22. In at least some implementations, the angle of the first and second ends 48, 50 is between 135 and 165 degrees. And in at least some implementations, the first end 48 and second end 50 are mirror images of each other about the vehicle centerline 60.

The first end 48 and second end 50 may include a forward edge or surface 66 and a rearward edge or surface 68, where the forward surface 66 leads the rearward surface 68 of the vehicle in forward vehicle travel. The forward surface 66 of each end 48, 50 of the cross member 44 may be closer to the vehicle centerline 60 than is the rearward surface 68. So arranged, the ends 48, 50 of the cross member 44 are oriented to, when engaged by an object, deflect the object outwardly away from the centerline 60 (and away from the engine), and/or deflect the vehicle away from the object.

Between the ends 48, 50, the cross member main body 46 includes a forward facing surface 70, rearward facing surface 72, upper surface 74 and lower surface 76, where forward and rearward relate to the fore-aft direction of the vehicle and upper and lower relate to the surface/ground on which the vehicle is situated. In at least some implementations, at least a portion of the forward facing surface 70 and at least a portion of the rearward facing surface 72 are curved and the cross member 44 does not extend linearly between the ends 48, 50. In at least some implementations, at least a portion of the forward facing surface 70 is concave and at least a portion of the rearward facing surface 72 is convex. The forward facing surface 70 of the cross member 44 has a length between the first end 48 and second end 50 (where that length may be curved as the forward facing surface is, or the length may be linear and measured in the direction perpendicular to the fore-aft centerline 60), and the forward facing surface 70, in at least some implementations, has a ratio of a radius of curvature to length of between 0.7 and 4.5.

Figure 2:
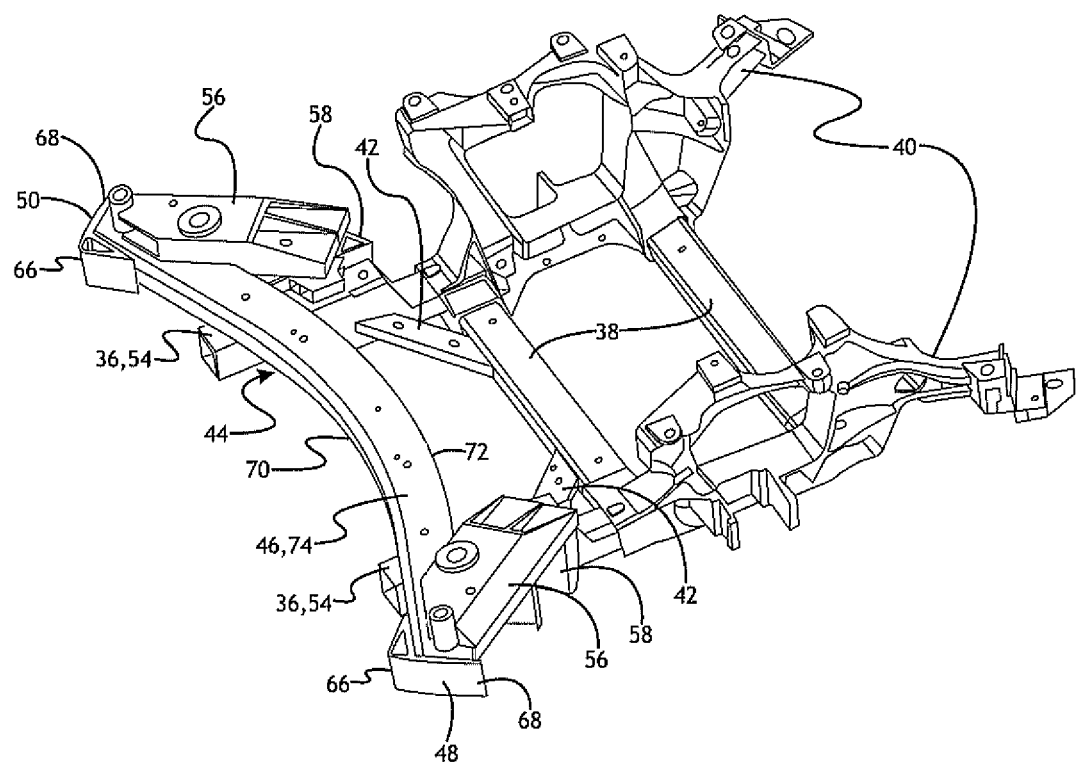
FIG. 2 is a top and left side perspective view of a portion of the vehicle structural assembly.
Figure 6:
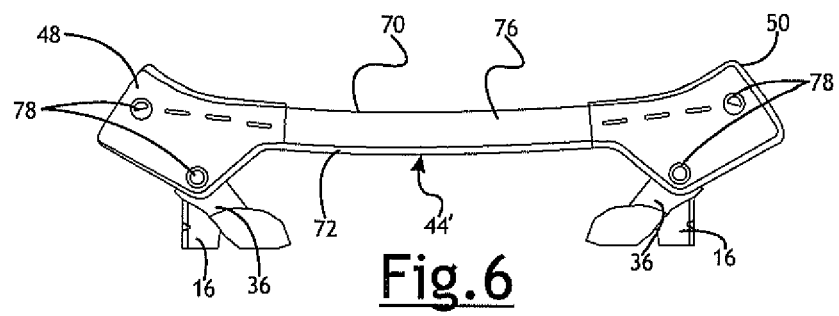
FIG. 6 is a bottom view of a cross member.

The cross member 44 may have a uniform or substantially uniform fore-aft thickness (i.e. the upper and lower surfaces 76, 78 may have a uniform fore-aft dimension), as is shown in FIGS. 1-3, or the fore-aft thickness of the cross member 44' may vary, as shown in FIG. 6. The arrangement shown in FIG. 6 provides additional fore-aft thickness in the areas of the cross member 44' that are coupled to other components of the vehicle, to provide suitable attachment points for connectors 78 (e.g. bolts), and may also be provided to provide a desired stiffness or strength of the cross member 44'. The stiffness and/or strength of the cross member 44 (hereinafter, cross member 44 may refer also to alternate cross member 44' when discussing general attributes of a cross member) may be chosen for a particular application to transfer forces within the chassis 10 as desired, and to provide enough strength to deflect the vehicle away from a fixed object or object of higher mass that engages an end 48 or 50 of the cross member 44. The curved cross member 44 that is concave in the forward facing direction may tend to straighten out when an end of the cross member 44 is engaged by an object. Such bending of the cross member 44 (which may be thought of as unbending of the normally bent cross member) is resisted by the resilience and stiffness of the cross member 44 which may then provide a reactive force that tends to move the vehicle away from the object, thereby improving the deflection of the vehicle away from the object (or the object away from the vehicle). Further, the curved cross member 44 may bear higher loads before plastically deforming (e.g. creasing or folding) to better maintain the cross member 44 in position and able to provide a force separating the vehicle and object.

In at least some implementations, the cross member 44 is connected to the chassis 10 inboard of the first end 48 and second end 50 of the main body 46, such that the ends 48, 50 are located outboard of the points of connection of the cross member 44 to the first and second portions of the chassis 10. To connect the cross member 44 to the chassis 10, the cross member 44 may include one or more through holes 80 arranged to receive a bolt or other connector or connector assembly. In at least some implementations, a bushing 82 is received within an opening 80 in the cross member 44, a coupler 84 is coupled to the side rail 16 and a bolt 86 tightens the bushing 82 and coupler 84 together. In more detail, the coupler 84 includes an internally threaded opening 88 aligned with a passage 90 through the bushing 82 defining an inner surface of the busing. The bolt 86 has an enlarged head 92 (or a washer, spacer or the like) that engages the bushing 82 and a threaded portion 94 that is received within the coupler opening 88 and engaged with the threads of the coupler 84. The coupler 84 may include a counterbore 96 in which an end of the bushing 82 is received, so that the bushing 82 is restrained against lateral movement relative to the coupler 84 (e.g. movement radially relative to an axis of the bushing and connector) by a flange 97 or shoulder of the counterbore. Tightening the bolt 86 maintains the bushing 82 within the counterbore 96 and firmly engages the bushing 82 with the coupler 84. This mechanically interlocks the bushing 82 and coupler 84 and defines a joint area greater in diameter than the diameter of the bolt 86. The enlarged joint area enables forces of an object hitting the cross member 44 to be carried by or exerted on the larger diameter and stronger hollow bushing 82 and coupler 84 rather than the smaller diameter bolt 86, which enables the structure to endure higher forces without a component (e.g. the bolt) breaking. In other implementations, the cross member 44 may be coupled to the rails 16 or other structure without any bushing 82 and/or coupler 84, such as by a simple nut and bolt, or by a weld adhesive or in some other manner.

What is claimed is:

1. A structural assembly for a vehicle, comprising:
   a first rail extending in a nominal direction of forward vehicle travel;
   a second rail extending in the nominal direction of forward vehicle travel;
   a cross member having a main body having a first end and a second end, and being joined inboard of the first end to the first rail and inboard of the second end to the second rail, wherein the first end and second end of the cross member are angled relative to the direction of forward vehicle travel at an obtuse angle of between 135 and 165 degrees.

2. The assembly of claim 1 wherein the main body has a forward facing surface that is concave and a rearward facing surface that is convex.

3. The assembly of claim 2 wherein the forward facing surface of the cross member has a length between the first end and second end, and wherein the forward facing surface is curved and has a ratio of a radius of curvature to length of between 0.7 and 4.5.

4. The assembly of claim 1 wherein the cross member is coupled to a main side rail of the vehicle chassis.

5. The assembly of claim 1 wherein the first end and second end are mirror images of each other.

6. The assembly of claim 1 which also includes an engine cradle and wherein the first rail and second rail are coupled to and/or define part of the engine cradle.

7. The assembly of claim 1 wherein the first rail and second rail are adapted to be received closer to a fore-aft centerline of the vehicle than are wells for vehicle front wheels.

8. The assembly of claim 7 wherein a cross-car length of the cross member is less than a cross-car distance between the wells for the vehicle front wheels.

9. The assembly of claim 1 which also comprises a connector coupled to the first rail and including a threaded section, a bushing aligned with the threaded section, and a bolt received through the bushing and having threads received in the threaded section, and wherein the cross member includes an opening into which the bushing extends and wherein the bushing engages the connector and the cross member is coupled to the first rail by the bolt, bushing and connector.

10. The assembly of claim 9 wherein the bushing mechanically interlocks with the connector providing a joint area larger than the diameter of the bolt.

11. The assembly of claim 10 wherein the connector includes a counterbore defined by a flange and wherein an end of the bushing is received within the counterbore such that the flange surrounds and axially overlaps the end of the bushing.

12. The assembly of claim 10 wherein the bushing is tubular and has an inner surface that defines an inner diameter that is larger than the outer diameter of the bolt providing clearance between the inner surface and the bolt.

13. A structural assembly for a vehicle, comprising:
   a first rail extending in a nominal direction of forward vehicle travel;
   a second rail extending in the nominal direction of forward vehicle travel;

a cross member having a main body having a first end and a second end, and being joined inboard of the first end to the first rail and inboard of the second end to the second rail, wherein the first end and second end of the cross member are angled relative to the direction of forward vehicle travel at an obtuse angle, wherein the first end and second end include a forward surface and a rearward surface, where the forward surface leads the rearward surface of the vehicle in forward vehicle travel, and wherein the forward surface is closer to a fore-aft centerline of the vehicle than is the rearward surface.

14. A structural assembly for a vehicle, comprising:
a chassis having a first portion and a second portion spaced from the first portion in a cross-car direction; and
a cross member having a main body having a first end and a second end, and being joined inboard of the first end to the first portion of the chassis and inboard of the second end to the second portion of the chassis, wherein the first end and second end of the cross member are angled relative to a direction of forward vehicle travel at an obtuse angle, wherein the first end and second end include a forward surface and a rearward surface, where the forward surface leads the rearward surface of the vehicle in forward vehicle travel, and wherein the forward surface is closer to a fore-aft centerline of the vehicle than is the rearward surface.

15. The assembly of claim 14 wherein the main body has a forward facing surface that is concave and a rearward facing surface that is convex.

16. The assembly of claim 15 wherein the forward facing surface has a length between the first end and second end, and wherein the forward facing surface is curved and has a ratio of a radius of curvature to length of between 0.7 and 4.5.

17. The assembly of claim 14 wherein the angle is between 135 and 165 degrees.

* * * * *